United States Patent
Okamoto

(10) Patent No.: US 9,536,323 B2
(45) Date of Patent: Jan. 3, 2017

(54) DATA STORAGE CONTROL APPARATUS, DATA STORAGE APPARATUS, DATA READOUT CONTROL APPARATUS, DATA STORAGE METHOD, COMPRESSION CIRCUIT, AND COMPRESSION METHOD

(71) Applicant: MegaChips Corporation, Osaka-shi (JP)

(72) Inventor: Akira Okamoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 61 days.

(21) Appl. No.: 14/368,112

(22) PCT Filed: Nov. 8, 2012

(86) PCT No.: PCT/JP2012/078954
§ 371 (c)(1),
(2) Date: Jun. 23, 2014

(87) PCT Pub. No.: WO2013/099449
PCT Pub. Date: Jul. 4, 2013

(65) Prior Publication Data
US 2014/0348437 A1 Nov. 27, 2014

(30) Foreign Application Priority Data
Dec. 26, 2011 (JP) .................................. 2011-282703

(51) Int. Cl.
*G06T 9/00* (2006.01)
*H04N 19/176* (2014.01)
(Continued)

(52) U.S. Cl.
CPC .............. *G06T 9/00* (2013.01); *H04N 19/103* (2014.11); *H04N 19/15* (2014.11); *H04N 19/176* (2014.11);
(Continued)

(58) Field of Classification Search
CPC ............ G06T 9/00–9/40; H04N 19/00–19/593
See application file for complete search history.

(56) References Cited

U.S. PATENT DOCUMENTS

| | | | | |
|---|---|---|---|---|
| 5,103,490 A | * | 4/1992 | McMillin | H04N 1/4177 235/440 |
| 5,915,042 A | * | 6/1999 | Matsushiro | G06T 9/005 382/181 |

(Continued)

FOREIGN PATENT DOCUMENTS

| | | |
|---|---|---|
| JP | 9 270919 | 10/1997 |
| JP | 2008 22082 | 1/2008 |

(Continued)

OTHER PUBLICATIONS

International Search Report Issued Feb. 26, 2013 PCT/JP12/078954 Filed Nov. 8, 2012.

(Continued)

*Primary Examiner* — Sean Motsinger
(74) *Attorney, Agent, or Firm* — Oblon, McClelland, Maier & Neustadt, L.L.P.

(57) ABSTRACT

A data storage control apparatus includes a compression part that performs lossless compression for reducing a data amount on image data that is in units of blocks, a determination element for determining whether lossless compression is possible or not, and a storage control part that performs storage control for, if the determination element has determined that lossless compression is possible, causing data obtained through lossless compression to be stored as compressed data in a storage part, and if the determination element has determined that lossless compression is not possible, causing the image data in units of blocks to be stored in the storage part.

14 Claims, 12 Drawing Sheets

(51) Int. Cl.
*H04N 19/15* (2014.01)
*H04N 19/593* (2014.01)
*H04N 19/103* (2014.01)
*H04N 19/46* (2014.01)
*H04N 19/423* (2014.01)

(52) U.S. Cl.
CPC ............ *H04N 19/46* (2014.11); *H04N 19/593* (2014.11); *H04N 19/423* (2014.11)

(56) References Cited

U.S. PATENT DOCUMENTS

| | | | | |
|---|---|---|---|---|
| 8,194,736 | B2 | 6/2012 | Youn | |
| 2003/0099147 | A1* | 5/2003 | Deng | G06F 3/0607 365/230.05 |
| 2005/0159643 | A1* | 7/2005 | Zinaty | A61B 1/041 600/109 |
| 2007/0065026 | A1* | 3/2007 | Lee | H04N 19/176 382/236 |
| 2007/0253629 | A1* | 11/2007 | Oshio | H04N 19/119 382/240 |
| 2008/0018746 | A1* | 1/2008 | Kawanami | H04N 1/2112 348/207.99 |
| 2008/0056381 | A1* | 3/2008 | Sung | H04N 19/423 375/240.26 |
| 2008/0089595 | A1* | 4/2008 | Park | H04N 19/176 382/233 |
| 2008/0107349 | A1* | 5/2008 | Sung | H03M 7/46 382/245 |
| 2009/0257485 | A1* | 10/2009 | Youn | H04N 19/176 375/240.01 |
| 2010/0135415 | A1* | 6/2010 | Song | H04N 19/176 375/240.24 |
| 2010/0299454 | A1* | 11/2010 | Lyashevsky | H04N 19/96 709/247 |
| 2011/0007976 | A1* | 1/2011 | Sugita | H04N 19/176 382/232 |
| 2011/0268367 | A1* | 11/2011 | Strom | G06T 15/405 382/233 |
| 2014/0044371 | A1 | 2/2014 | Madanbashi et al. | |
| 2014/0219573 | A1* | 8/2014 | Teng | G06T 9/00 382/232 |
| 2015/0187306 | A1* | 7/2015 | Syu | G09G 3/3655 345/87 |

FOREIGN PATENT DOCUMENTS

| | | |
|---|---|---|
| JP | 2008 28534 | 2/2008 |
| JP | 2009 260977 | 11/2009 |
| JP | 2010 135975 | 6/2010 |

OTHER PUBLICATIONS

International Preliminary Report on Patentability and Written Opinion issued Jul. 10, 2014, in International Application No. PCT/JP2012/078954 (with English translation).

Japanese Office Action issued Feb. 23, 2016 in Patent Application No. 2011-282703 (with partial English translation).

* cited by examiner

F I G. 3
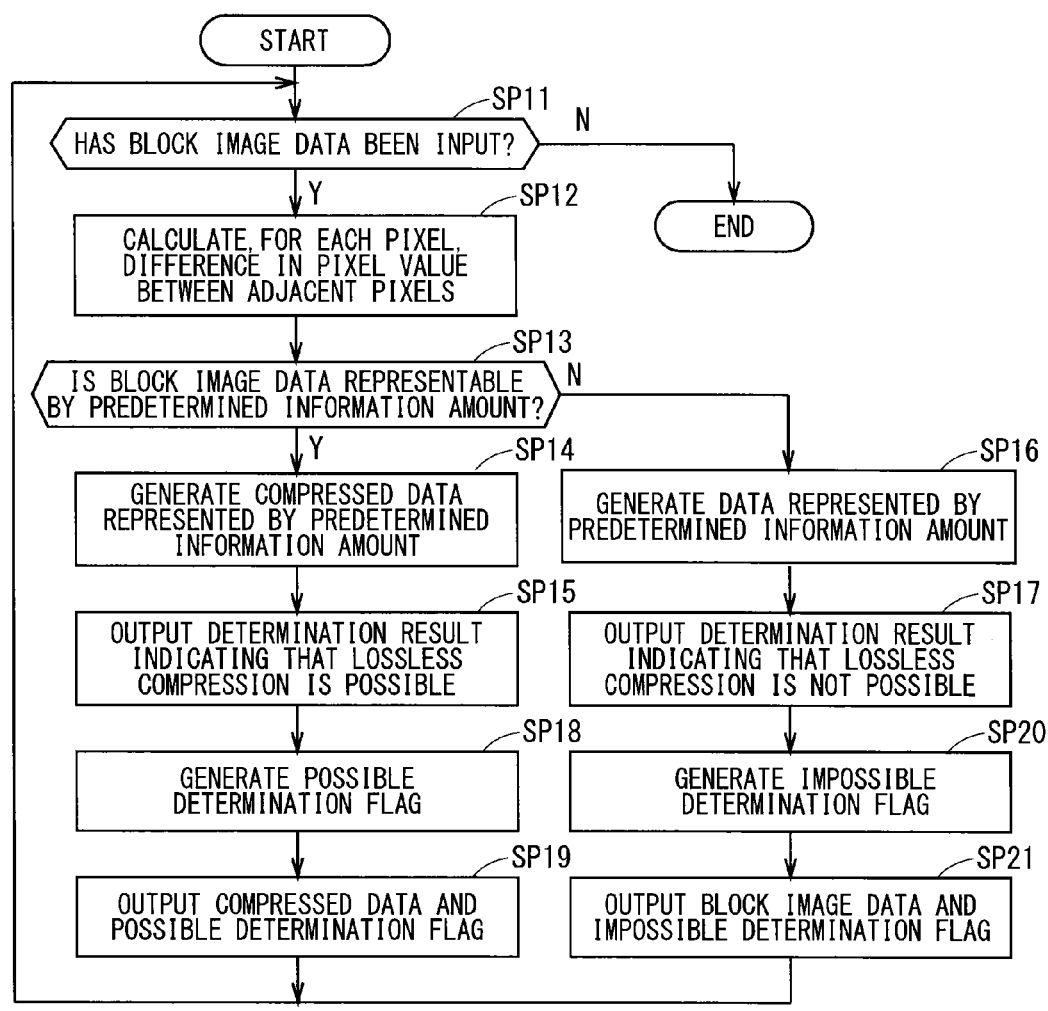

| | +2 | +1 | +4 | +3 | +2 | −5 | +2 |
|---|---|---|---|---|---|---|---|
| KP<br>P01 | 128 | 130 | 131 | 135 | 138 | 140 | 135 | 137 |
| | 135 | 140 | 137 | | | | | |
| | 130 | 135 | | | | | | |
| | 132 | | | | | | | |
| | 130 | | | | | | | |
| | 132 | | | | | | | |
| | 130 | | | | | | | |
| | 132 | | | | | | | |

F I G. 6

|  | +2 | +1 | +4 | +3 | +2 | −5 | +2 |
|---|---|---|---|---|---|---|---|
| KP→ 128 | 130 | 131 | 135 | 138 | 140 | 135 | 137 |
| +7 ( 135 P10→ | 140 | 137 | | | | | |
| −5 ( 130 | 135 | | | | | | |
| +2 ( 132 | | | | | | | |
| −2 ( 130 | | | | | | | |
| +2 ( 132 | | | | | | | |
| −2 ( 130 | | | | | | | |
| +2 ( 132 | | | | | | | |

F I G. 8

```
          0010 0001 0100 0011 0010 1011 0010
            ↑    ↑    ↑    ↑    ↑    ↑    ↑
           +2   +1   +4   +3   +2   -5   +2
```

|  | | | | | | | |
|---|---|---|---|---|---|---|---|
| KP → 128 | 130 | 131 | 135 | 138 | 140 | 135 | 137 |
| 135 | 140 | 137 | | | | | |
| 130 | 135 | | | | | | |
| 132 | | | | | | | |
| 130 | | | | | | | |
| 132 | | | | | | | |
| 130 | | | | | | | |
| 132 | | | | | | | |

0111 ← +7
1011 ← −5
0010 ← +2
1110 ← −2
0010 ← +2
1110 ← −2
0010 ← +2

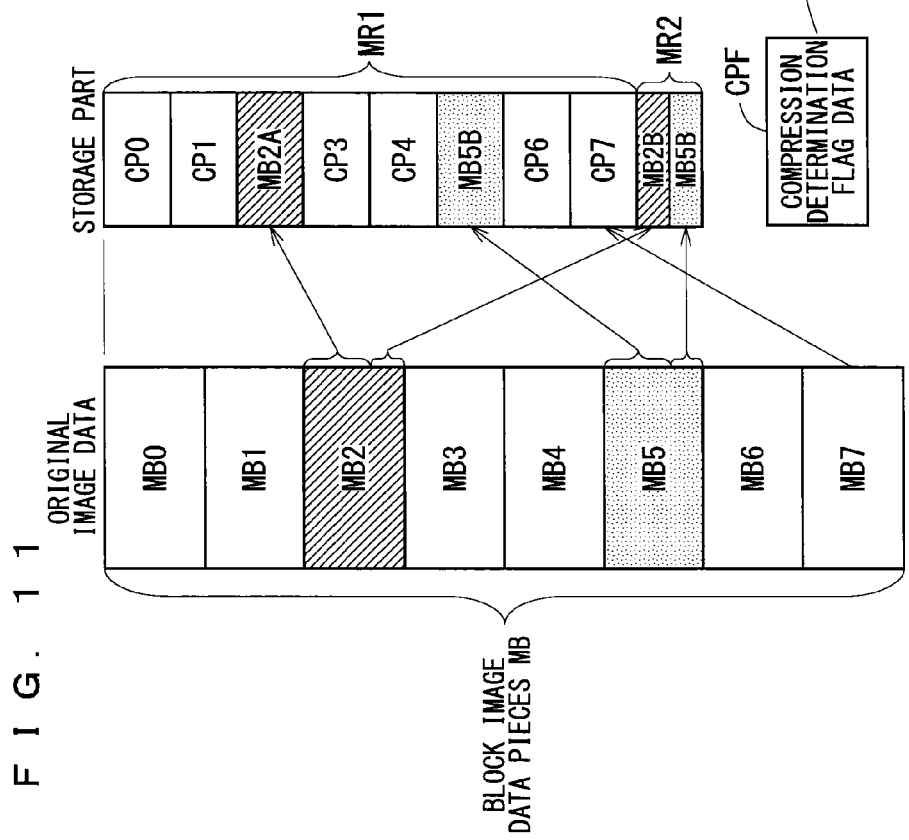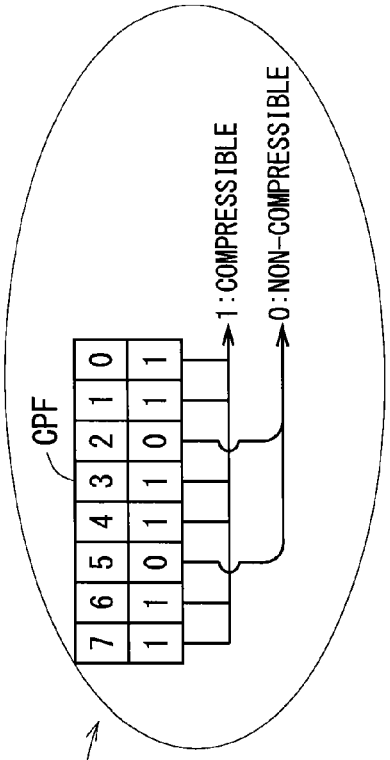
F I G . 1 1

F I G . 1 3
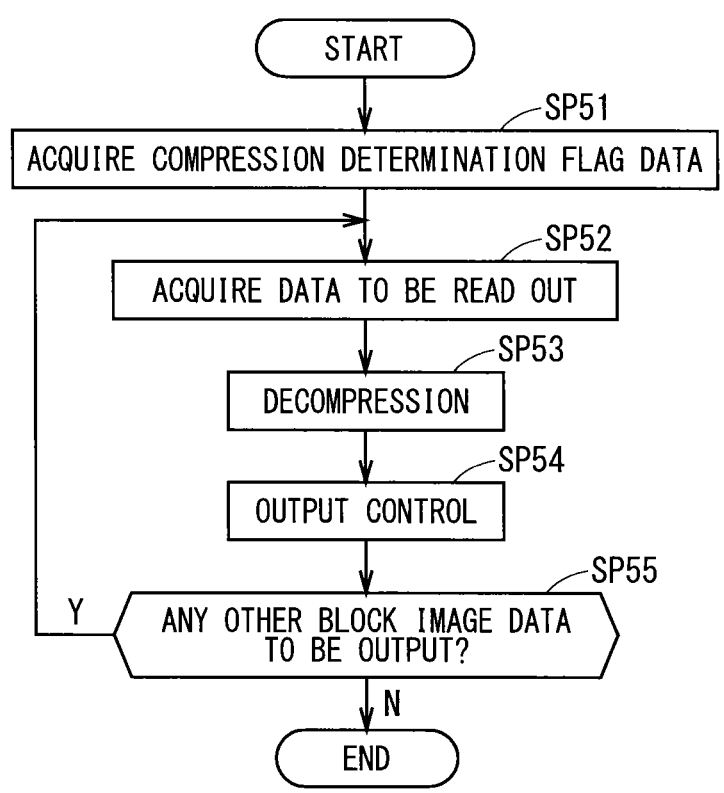

DATA STORAGE CONTROL APPARATUS, DATA STORAGE APPARATUS, DATA READOUT CONTROL APPARATUS, DATA STORAGE METHOD, COMPRESSION CIRCUIT, AND COMPRESSION METHOD

TECHNICAL FIELD

The present invention relates to a technique for storing data.

BACKGROUND ART

Compression processing is performed on image data of still images and moving images for the purpose of reducing the amount of data.

For example, Patent Document 1 discloses a technique for combining lossy compression and lossless compression and compressing video data to a smaller size.

PRIOR ART DOCUMENTS

Patent Documents

Patent Document 1: Japanese Patent Application Laid-Open No. 2009-260977

SUMMARY OF INVENTION

Problems to be Solved by the Invention

In lossless compression, lossless data with no data degradation can be generated, but the amount of data cannot always be reduced, and conversely, in some cases the data amount may even increase.

In view of this, it is an object of the present invention to provide a technique that greatly enhances the possibility of being able to reduce the amount of data while generating lossless data with no data degradation.

Means for Solving the Problems

A first aspect of a data storage control apparatus according to the present invention includes a compression element for performing lossless compression for reducing a data amount on image data that is in units of blocks, a determination element for determining whether the lossless compression is possible or not, and a storage control element for performing storage control for, in a case where the determination element determines that lossless compression is possible, causing data obtained through the lossless compression to be stored as compressed data in a storage part, and in a case where the determination element determines that lossless compression is not possible, causing the image data in units of blocks to be stored in the storage part.

A second aspect of the data storage control apparatus according to the present invention is that in the above-described first aspect, the compression element sequentially receives input of the image data in units of blocks that is obtained by dividing original image data, the compression element performs the lossless compression on each image data piece in units of blocks that is sequentially input, the determination element determines whether the lossless compression is possible or not for each image data piece, and the storage control element performs the storage control on each image data piece on the basis of a result of determination by the determination element regarding each image data piece.

A third aspect of the data storage control apparatus according to the present invention is that in the above-described second aspect, the storage control element performs the storage control for, in a case where the determination element determines that lossless compression is possible, causing the compressed data to be stored in a first storage area of the storage part, and in a case where the determination element determines that lossless compression is not possible, among the image data in units of blocks, causing image data that has a data amount equal to a data amount of the compressed data to be stored as partial data in the first storage area and causing remaining data other than the partial data to be stored in a second storage area of the storage part.

A fourth aspect of the data storage control apparatus according to the present invention is that in the above-described third aspect, the storage control element stores the compressed data and the partial data such that addresses indicating storage locations of the compressed data and the partial data in the first storage area are at equal intervals.

A fifth aspect of the data storage control apparatus according to the present invention is that in one of the above-described first to fourth aspects, the data storage control apparatus further includes a flag generation element for generating a compression determination flag that indicates whether lossless compression is possible or not, on the basis of a result of determination by the determination element, and the storage control element stores the compression determination flag in the storage part.

A sixth aspect of the data storage control apparatus according to the present invention is that in one of the above-described first to fifth aspects, the compression element is configured to determine a reference pixel from among pixels constituting a block image and calculate a difference in pixel value between adjacent pixels for each normal pixel other than the reference pixel so that a pixel value of each normal pixel is specified from a pixel value of the reference pixel, and to convert a data amount by representing the difference in pixel value calculated for each normal pixel by a smaller number of bits than the number of bits used to represent the pixel value of the reference pixel.

A seventh aspect of the data storage control apparatus according to the present invention is that in one of the above-described first to fifth aspects, the compression element is configured to determine a pixel at one corner of a block image as a reference pixel, calculate a difference in pixel value between adjacent pixels for each pixel in the same row as the reference pixel, and calculate a difference in pixel value between adjacent pixels for each pixel in each column of pixels constituting the block image, and to convert a data amount by, while holding a pixel value of the reference pixel, representing each calculated difference in pixel value between adjacent pixels by a smaller number of bits than the number of bits used to represent the pixel value of the reference pixel.

An eighth aspect of the data storage control apparatus according to the present invention is that in one of the first to fifth aspects, the compression element is configured to determine a pixel at one corner of a block image as a reference pixel, calculate a difference in pixel value between adjacent pixels for each pixel in the same column as the reference pixel, and calculate a difference in pixel value between adjacent pixels for each pixel in each row of pixels constituting the block image, and to convert a data amount by, while holding a pixel value of the reference pixel, representing each calculated difference in pixel value between adjacent pixels by a smaller number of bits than the number of bits used to represent the pixel value of the reference pixel.

A ninth aspect of the data storage control apparatus according to the present invention is that in one of the above-described sixth to eighth aspects, the determination element determines that the lossless compression is possible, in a case where the differences in pixel value for each normal pixel are all representable by the smaller number of bits.

A data storage apparatus according to the present invention includes a data storage control apparatus according to one of the above-described first to ninth aspects and the storage part that is electrically connected to the data storage control apparatus. The data storage control apparatus and the storage part are mounted on the same chip.

A data readout control apparatus according to the present invention is capable of reading out storage data from a storage part that stores, as the storage data, compressed data of image data in units of blocks that is stored when lossless compression of the image data in units of blocks is possible or the image data in units of blocks that is stored when the lossless compression is not possible, and a compression determination flag indicating whether the lossless compression is possible or not. The data readout control apparatus includes a readout element for reading out the storage data, a decompression element capable of decompressing the compressed data included in the storage data, and a selection element for, in a case where the storage data includes a compression determination flag indicating that the lossless compression is possible, outputting data obtained through the decompression, and in a case where the storage data includes a compression determination flag indicating that the lossless compression is not possible, outputting the image data in units of blocks that is included in the storage data.

A data storage method according to the present invention includes the steps of a) performing lossless compression for reducing a data amount on image data that is in units of blocks, b) determining whether the lossless compression is possible or not, and c) in a case where it is determined in the step b) that lossless compression is possible, storing data obtained through the lossless compression as compressed data in a storage part, and in a case where it is determined in the step b) that lossless compression is not possible, storing the image data in units of blocks in the storage part.

A compression circuit according to the present invention is a compression circuit for use in the compression element of a data storage control apparatus according to one of the above-described first to fifth aspects. The compression circuit includes a calculation element for determining a reference pixel from among pixels constituting a block image and calculating a difference in pixel value between adjacent pixels for each normal pixel other than the reference pixel so that a pixel value of each normal pixel is specified from a pixel value of the reference pixel, and a conversion element for converting a data amount by representing the difference in pixel value calculated for each normal pixel by a smaller number of bits than the number of bits used to represent the pixel value of the reference pixel.

A compression method according to the present invention is a compression method executed by the compression element of a data storage control apparatus according to one of the above-described first to fifth aspects. The compression method includes the steps of a) determining a reference pixel from among pixels constituting a block image and calculating a difference in pixel value between adjacent pixels for each normal pixel other than the reference pixel so that a pixel value of the normal pixel is specified from a pixel value of the reference pixel, and b) converting a data amount by representing the difference in pixel value calculated for each normal pixel by a smaller number of bits than the number of bits used to represent the pixel value of the reference pixel.

A compression circuit according to the present invention is a compression circuit for compressing image data of an original image having a size of N×M pixels, where N and M are natural numbers. The compression circuit includes a calculation element for determining a reference pixel from among pixels constituting the original image and calculating a difference in pixel value between adjacent pixels for each normal pixel other than the reference pixel so that a pixel value of each normal pixel is specified from a pixel value of the reference pixel, and a conversion element for converting a data amount by representing the difference in pixel value calculated for each normal pixel by a smaller number of bits than the number of bits used to represent the pixel value of the reference pixel.

A compression method according to the present invention is a method for compressing image data of an original image having a size of N×M pixels, where N and M are natural numbers. The compression method includes the steps of a) determining a reference pixel from among pixels constituting the original image and calculating a difference in pixel value between adjacent pixels for each normal pixel other than the reference pixel so that a pixel value of each normal pixel is specified from a pixel value of the reference pixel, and b) converting a data amount by representing the difference in pixel value calculated for each normal pixel by a smaller number of bits than the number of bits used to represent the pixel value of the reference pixel.

Advantageous Effects of the Invention

According to the present invention, the possibility of being able to reduce the amount of data while generating lossless data with no data degradation can be greatly enhanced.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a flowchart of operations performed by the data storage control apparatus.

FIG. 6 is a diagram for describing the lossless compression technique.

FIG. 8 is a diagram for describing the lossless compression technique.

FIG. 11 shows another mode of storing data in the storage part.

FIG. 13 is a flowchart of operations performed by the data readout control apparatus.

DESCRIPTION OF EMBODIMENTS

The following describes an embodiment with reference to the drawings.

1. Embodiment

1-1. Outline

Figure 1:
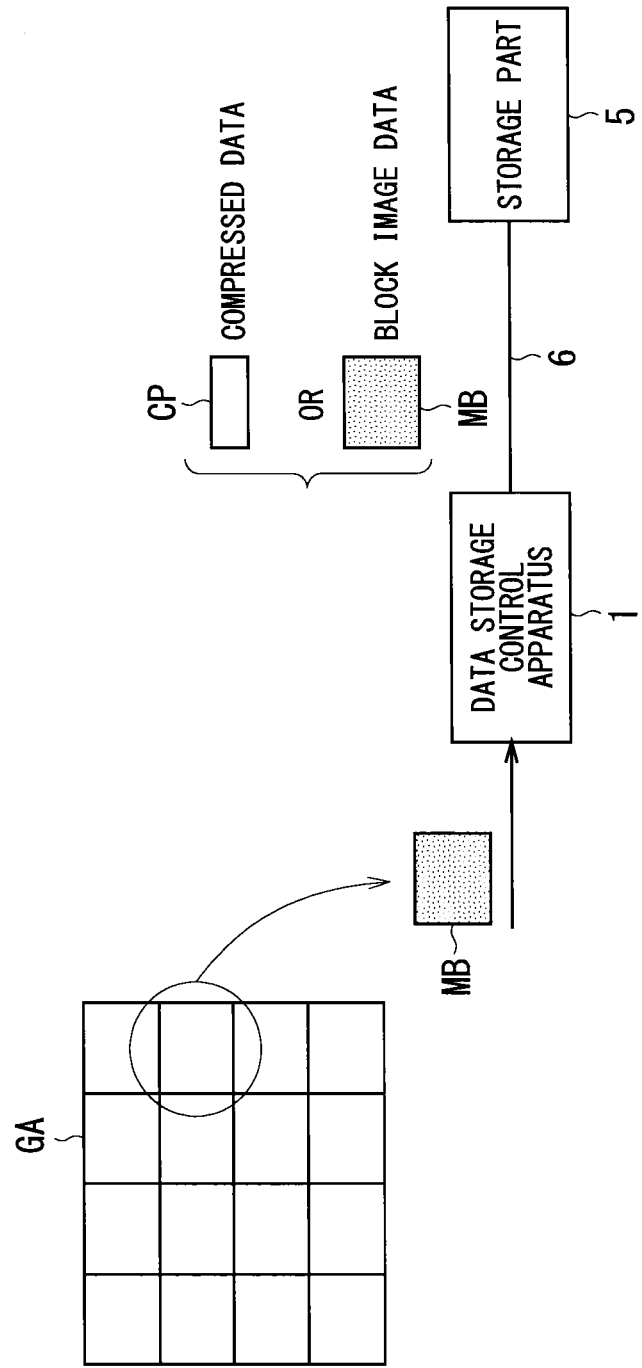
FIG. 1 shows an outline of operations performed by a data storage control apparatus according to an embodiment of the present invention.

FIG. 1 shows an outline of operations performed by a data storage control apparatus 1 according to an embodiment of the present invention.

As shown in FIG. 1, the data storage control apparatus 1 sequentially receives input of image data MB in units of blocks (also referred to as "block image data"), the image data being obtained by dividing an image GA as a whole into a plurality of blocks. The data storage control apparatus 1 sequentially performs predetermined lossless compression on the sequentially input block image data MB, which is original image data.

The predetermined lossless compression used here is processing that can reliably reduce the amount of data, but there are also cases in which lossless compression cannot be performed depending on the block image data MB to be compressed.

In view of this, the data storage control apparatus 1 determines whether lossless compression is possible or not, i.e., whether or not the block image data MB can be restored from data obtained through lossless compression, and controls data to be stored in a storage part 5 according to the determination result. Specifically, if lossless compression is possible, the data storage control apparatus 1 outputs compressed data CP obtained through lossless compression and stores the compressed data CP in the storage part 5. On the other hand, if lossless compression is not possible, the data storage control apparatus 1 outputs the block image data MB that has not undergone lossless compression and stores the block image data MB in the storage part 5.

In this way, for a block that lossless compression is possible, the data storage control apparatus 1 stores the compressed data CP with a reduced data amount in the storage part 5. Thus, data regarding the image GA can be stored in the storage part 5 after reducing the data amount. This allows the use of buses 6 to be reduced when the data regarding the image GA is read out or written, thus making it possible to reduce power consumption and the amount of time required for data transfer.

As described above, the data storage control apparatus 1 is configured to store the compressed data CP with a reduced data amount in the storage part 5 for blocks that lossless compression is possible and to store the original block image data MB in the storage part 5 for blocks that lossless compression is not possible. By using the data storage control apparatus 1, it is possible to store lossless data having no degradation in the storage part 5 and to completely restore the original image GA from the data stored in the storage part 5.

1-2. Configuration of Data Storage Control Apparatus

Figure 2:
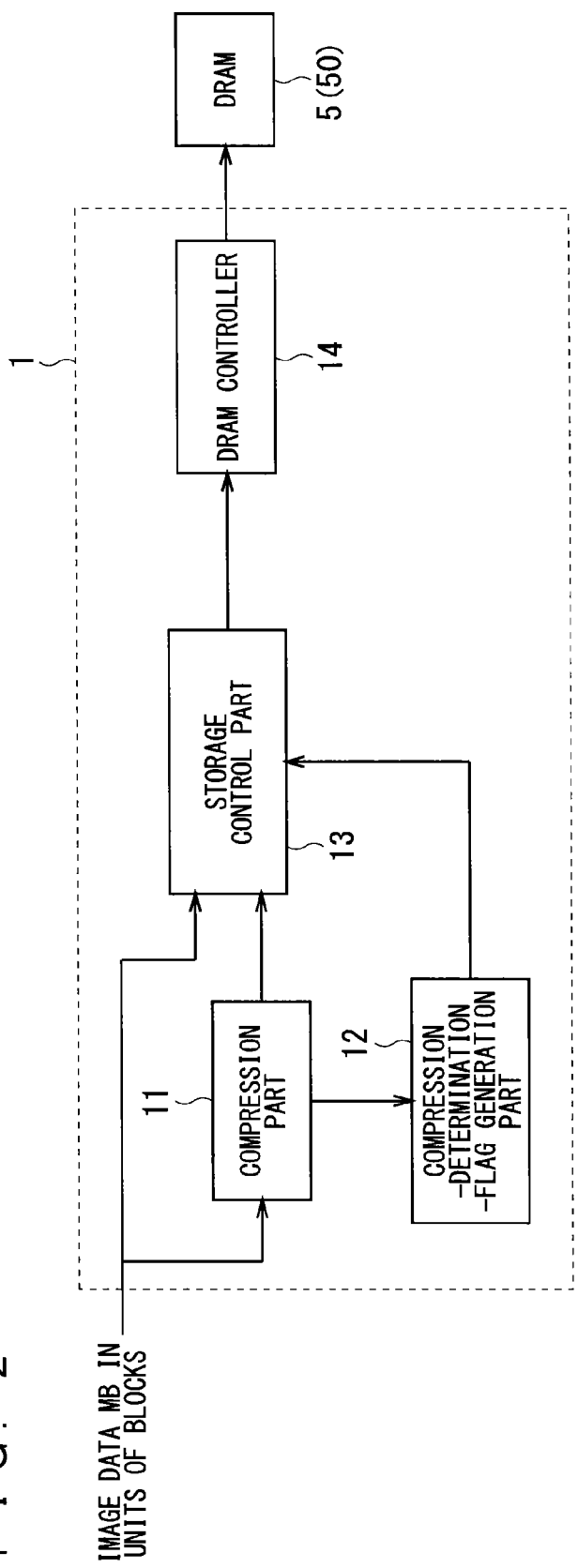
FIG. 2 is a block diagram showing a configuration of the data storage control apparatus according to the embodiment of the present invention.

Next is a description of a configuration of the data storage control apparatus 1. FIG. 2 is a block diagram showing a configuration of the data storage control apparatus 1 according to an embodiment of the present invention.

As shown in FIG. 2, the data storage control apparatus 1 is electrically connected to a DRAM 50 serving as the storage part 5 via a bus 6.

The data storage control apparatus 1 includes a compression part 11, a compression-determination-flag generation part 12, a storage control part 13, and a DRAM controller 14. The block image data MB that has been input to the data storage control apparatus 1 is input to each of the compression part 11 and the storage control part 13.

The compression part 11 performs predetermined lossless compression on the block image data MB. The compression part 11 also functions as determination means for determining whether lossless compression is possible or not. The compression part 11 outputs data obtained through lossless compression as compressed data to the storage control part 13 and also outputs the result of determination regarding whether lossless compression is possible or not to the compression-determination-flag generation part 12.

The compression-determination-flag generation part 12 generates a compression determination flag on the basis of the determination result that is input from the compression part 11. Specifically, when having received input of the determination result indicating that lossless compression is possible, the compression-determination-flag generation part 12 generates "1" as the compression determination flag and outputs the generated compression determination flag to the storage control part 13. On the other hand, when having received input of the determination result indicating that lossless compression is not possible, the compression-determination-flag generation part 12 generates "0" as the compression determination flag and outputs the generated compression determination flag to the storage control part 13.

The storage control part 13 selects and outputs either the block image data MB that has not undergone lossless compression or the compressed data CP on the basis of the compression determination flag input from the compression-determination-flag generation part 12. Specifically, when having received input of the compression-determination flag "1" indicating that lossless compression is possible, the storage control part 13 outputs the compressed data CP to the DRAM controller 14. On the other hand, when having received input of the determination flag "0" indicating that lossless compression is not possible, the storage control part 13 outputs the block image data MB that has not undergone lossless compression to the DRAM controller 14.

The storage control part 13 also functions as an address generation part that generates an address (write address) indicating the storage location of output data (compressed data CP or block image data MB) in the storage part 5. In other words, the storage control part 13 generates the write addresses of the compressed data CP and the block image data MB and outputs the generated write addresses to the DRAM controller 14.

The DRAM controller 14 causes the output data of the storage control part 13 to be stored in the storage location specified by the write address in the DRAM 50.

1-3. Operations of Data Storage Control Apparatus

Figures 4, 5:
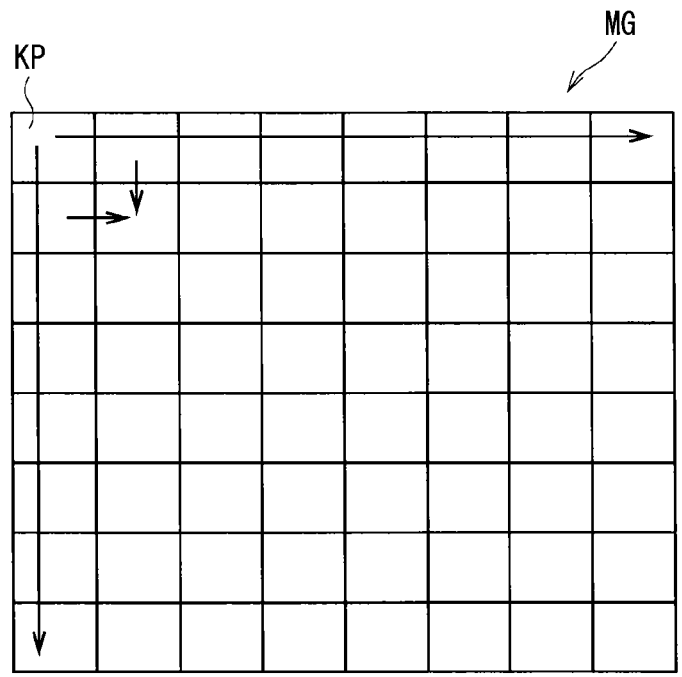
FIG. 4 shows a block image that is input to the data storage control apparatus.
FIG. 5 is a diagram for describing a lossless compression technique.

Next is a description of operations performed by the data storage control apparatus 1. FIG. 3 is a flowchart of the operations of the data storage control apparatus 1. FIG. 4 shows a block image MG that is input to the data storage control apparatus 1. FIGS. 5 to 8 are diagrams for describing a lossless compression technique. Note that in FIGS. 5 and 6, a pixel value of each pixel is represented by 8 bits.

As shown in FIG. 3, in step SP11, the data storage control apparatus 1 determines whether or not the block image data MB has been input. If the block image data MB has been input, the operational procedure proceeds to step SP12, and if the block image data MB has not been input, the operational procedure ends.

The following steps SP12 to SP17 are steps executed by the compression part 11 and in which predetermined lossless compression is performed on the input block image data MB.

One example of the lossless compression technique that can be adopted is a technique for determining a reference pixel in the block image MG, holding a pixel value of the reference pixel, and representing pixel value information regarding pixels (normal pixels) other than the reference pixel on the basis of differences in pixel value between pixels adjacent in a given direction.

Here, the description of the above lossless compression technique takes the example of the case where, as shown in FIG. 4, the input block image data MB is image data of an 8×8 pixel block image MG, and the upper leftmost pixel in the block image MG is a reference pixel KP.

In step SP12, a difference in pixel value between adjacent pixels is first calculated for each of the pixels constituting the block image MG.

Specifically, a difference in pixel value from the pixel adjacent on the left side is calculated for each pixel in the first row of the block image MG. The calculated difference becomes pixel value information regarding the pixel value of each pixel. For example, as shown in FIG. 5, when the reference pixel KP has a pixel value of "128" and a pixel P01 adjacent on the right side to the reference pixel KP has a pixel value of "130," the pixel value information regarding the pixel P01 is "+2," which is obtained by subtracting the pixel value of the reference pixel KP from the pixel value of the pixel P01. In this way, a difference in pixel value from the pixel adjacent on the left side is sequentially calculated to acquire pixel value information regarding each pixel in the first row of the block image MG.

Next, a difference in pixel value from the pixel adjacent on the upper side is calculated for each pixel in the first column of the block image MG. For example, as shown in FIG. 6, when a pixel P10 adjacent on the lower side to the reference pixel KP has a pixel value of 135, pixel value information regarding the pixel P10 is "+7," which is obtained by subtracting the pixel value of the reference pixel KP from the pixel value of the pixel P10. In this way, a difference in pixel value from the pixel adjacent on the upper side is sequentially calculated to acquire pixel value information regarding each pixel in the first column of the block image MG.

Figure 7:
FIG. 7 is a diagram for describing the lossless compression technique.

For each pixel other than the pixels belonging to the first row and the first column, a difference in pixel value from the pixel adjacent on the left side and a difference in pixel value from the pixel adjacent on the upper side are both calculated. FIG. 7 shows a pixel value information group UD obtained by calculating a difference in pixel value from the pixel adjacent on the upper side for each pixel other than the pixels belonging to the first row and the first column, and a pixel value information group LD obtained by calculating a difference in pixel value from the pixel adjacent on the left side for each pixel other than the pixels belonging to the first row and the first column.

As described above, in step SP12, for each normal pixel other than the reference pixel KP among all of the pixels constituting the block image MG, the pixel value information regarding the pixel is acquired by calculating differences in pixel value from adjacent pixels.

By using the pixel value information regarding each pixel, it is possible to specify the pixel value of each normal pixel from the pixel value of the reference pixel KP. Thus, it can be said that the differences in pixel value between each normal pixel value and adjacent pixels are calculated in order to make it possible to specify the pixel value of the normal pixel from the pixel value of the reference pixel KP.

It can also be said that the aforementioned pixel value information group UD is obtained by, where a pixel at one corner of the block image MG is the reference pixel KP, calculating a difference in pixel value between adjacent ones of respective pixels in the same row as the reference pixel KP and calculating a difference in pixel value between adjacent ones of respective pixels in each column of pixels constituting the block image MG.

It can also be said that the aforementioned pixel value information group LD is obtained by, where a pixel at one corner of the block image MG is the reference pixel KP, calculating a difference in pixel value between adjacent ones of respective pixels in the same column as the reference pixel KP and calculating a difference in pixel value between adjacent ones of respective pixels in each row of pixels constituting the block image MG.

Next, in step SP13, it is determined whether or not the pixel value information regarding each pixel other than the reference pixel KP is all representable by a prescribed amount of information (prescribed information amount). The prescribed information amount used here is a capacity (also referred to as a "pixel representation capacity") predetermined to represent the pixel value information and is set to a number of bits smaller than that used to represent the pixel value of the reference pixel, or in other words, the pixel value of the original image data. Here is shown an example of the case where the pixel value of each pixel in the block image MG is represented by 8 bits. The prescribed information amount here is thus set to 4, 5, or 6 bits, for example.

Specifically, if the representation capacity is set to 4 bits, it is determined in step SP13 whether or not the pixel value information regarding each pixel other than the reference pixel KP is all representable by 4 bits. Whether or not the pixel value information is representable by 4 bits can be determined based on whether or not the pixel value information is included in the range of numerical values that is representable by 4 bits (i.e., in the range of −8 to +7). Note that it is assumed here that two's complement notation is used to represent pixel value information regarding negative values.

For example, in the pixel value information group UD shown in FIG. 7, pixel value information "+10" regarding a pixel P11 is not representable by 4 bits. Thus, it is determined that the pixel value information group UD is not representable by 4 bits. On the other hand, in the pixel value information group LD, the pixel value information regarding each pixel is all included in the range of numerical values that is representable by 4 bits. Thus, it is determined that the pixel value information group LD is representable by 4 bits.

While the two pixel value information groups are acquired in step SP12 according to the directions in which differences in pixel value are calculated, if at least one of the two pixel value information groups is representable by 4 bits, it is determined in step SP13 that the pixel value information regarding each pixel is representable by the prescribed information amount.

If it is determined in step SP13 that the pixel value information regarding each pixel is representable by the prescribed information amount, the operational procedure proceeds to step SP14. On the other hand, if it is determined that the pixel value information regarding each pixel is not representable by the prescribed information amount, i.e., if it is determined that both of the two pixel value information groups are not representable by the prescribed information amount, the operational procedure proceeds to step SP16.

In step SP14, the pixel value information groups determined to be representable by the prescribed information amount is represented by the prescribed information amount to generated the compressed data CP.

Specifically, if the prescribed information amount is 4 bits, as shown in FIG. 8, the base number of the pixel value information calculated as a difference in pixel value between adjacent pixels is converted to be represented by 4 bits using two's complement notation. This produces the compressed data CP in which the pixel value information regarding each pixel other than the reference pixel KP is represented by 4 bits. In this way, if the prescribed information amount is 4 bits, the pixel value of each pixel represented by 8 bits will be represented by 4 bits, and, accordingly, the data amount is reduced to approximately one half of the original data amount by the compression.

Although the above description takes the example of the case where the prescribed information amount for representing pixel value information is 4 bits, the compression rate can be changed by changing the prescribed information amount.

For example, if the prescribed information amount is set to 5 bits, the pixel value of each pixel represented by 8 bits will be represented by five bits, and, accordingly, the data amount will be reduced to approximately two thirds of the original data amount.

If the prescribed information amount is set to 6 bits, the pixel value of each pixel represented by 8 bits will be represented by 6 bits, and, accordingly, the data amount will be reduced to approximately three-quarters of the original data amount.

As described above, the compression part 11 includes calculation means for calculating differences in pixel value between adjacent pixels to acquire the pixel value information groups UD and LD, and conversion means for converting the data amount by representing the differences in pixel value between adjacent pixels calculated by the calculation means by a smaller number of bits than the number of bits used to represent the pixel value of the reference pixel KP, so as to generate the compressed data CP. Then, the compressed data CP generated by the compression part 11 is output to the storage control part 13.

Note that the compressed data CP output from the compression part 11 includes direction flags that indicate directions in which differences in pixel value are calculated when generating the compressed data CP. The direction flags are used to decompress the compressed data CP.

The pixel values used in the description of the above lossless compression each correspond to a value of the luminance signal when the image GA is a monochrome image and correspond to a luminance signal Y and color signals regarding colors when the image GA is a color image. For example, in a color image in the YUV format, the luminance signal Y and two color difference signals U and V are used as pixel values, and the above-described compression processing is performed on each of the Y, U, and V values.

Since the color difference signals U and V have relatively smaller changes between pixels than the luminance signal Y, the prescribed information amount for representing the pixel value information regarding the color difference signals U and V may be reduced in comparison with the prescribed information amount for representing the pixel value information regarding the luminance signal Y. Specifically, for example, the pixel value information regarding the luminance signal may be represented by 4 pixels, and the pixel value information regarding the color difference signals may be represented by 3 bits. In this case, it is possible to further reduce the data amount of the compressed data in accordance with the characteristics of the signals.

Next, in step SP15, the determination result indicating that lossless compression is possible is output from the compression part 11 to the compression-determination-flag generation part 12.

In step SP18, a compression determination flag "1" (possible determination flag) indicating that lossless compression is possible is generated by the compression-determination-flag generation part 12 and output to the storage control part 13.

Then, in step SP19, the storage control part 13 outputs the compressed data CP and possible determination flag to the DRAM controller 14. The storage control part 13 also generates and outputs write addresses indicating storage locations of the compressed data CP and the possible determination flag in the DRAM 50.

If the operational procedure proceeds from step SP13 to step SP16, then in step SP16, data is generated through compression processing in which one of the two pixel value information groups, which have been determined to not be representable by the prescribed information amount, is represented by the prescribed information amount.

Note that in the data obtained through the compression processing, pixel value information that is not representable by the prescribed information amount is represented by "0," for example.

In step SP17, the determination result indicating that lossless compression is not possible is output from the compression part 11 to the compression-determination-flag generation part 12.

Next, in step SP20, a compression determination flag (impossible determination flag) "0" indicating that lossless compression is not possible is generated by the compression-determination-flag generation part 12 and output to the storage control part 13.

In step SP21, the storage control part 13 outputs the block image data MB and impossible determination flag to the DRAM controller 14. The storage control part 13 also generates and outputs write addresses indicating storage locations of the block image data MB and the impossible determination flag in the DRAM 50.

1-4. Storage Control

Figure 9:
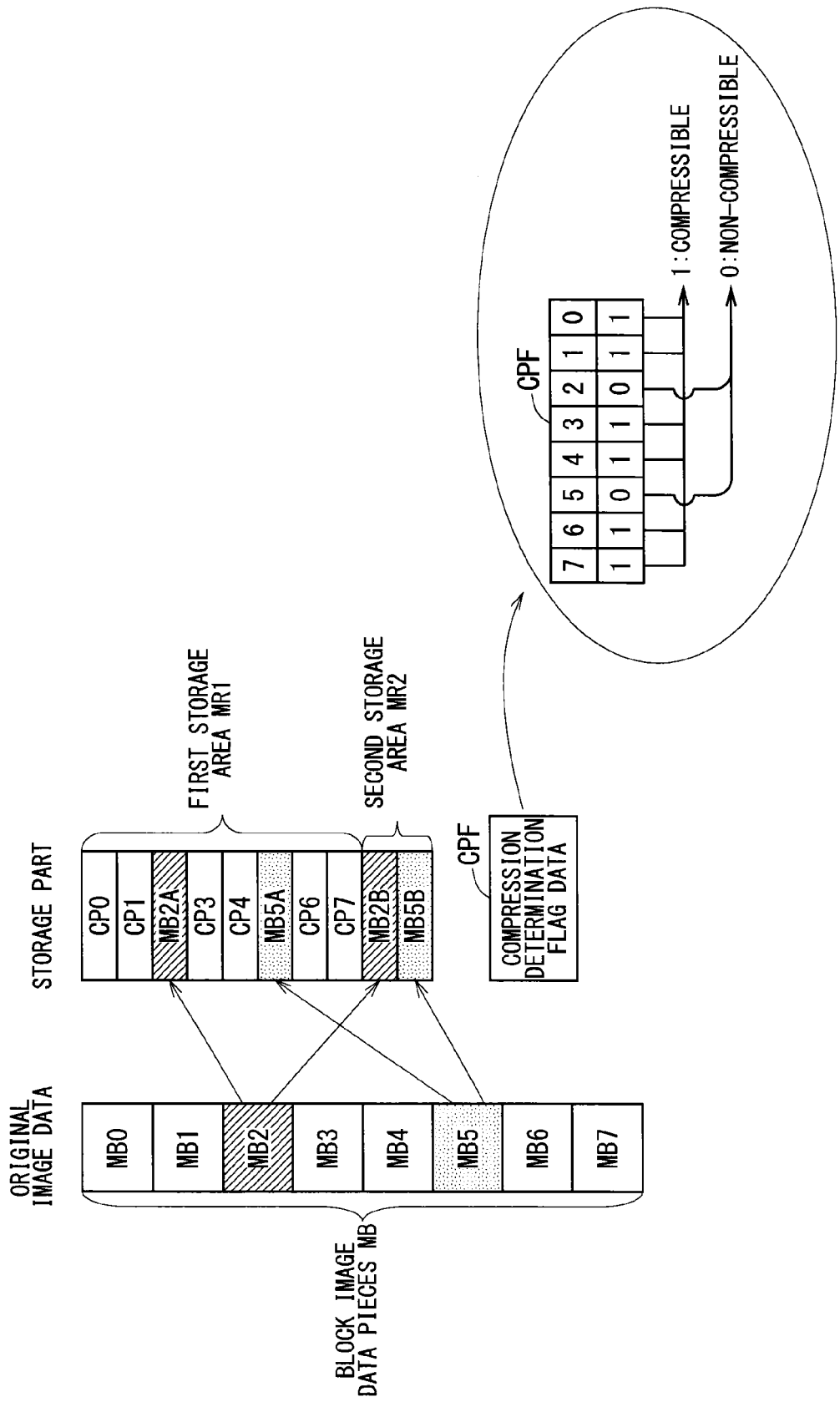
FIG. 9 shows a mode of storing data in a storage part.
Figure 10:
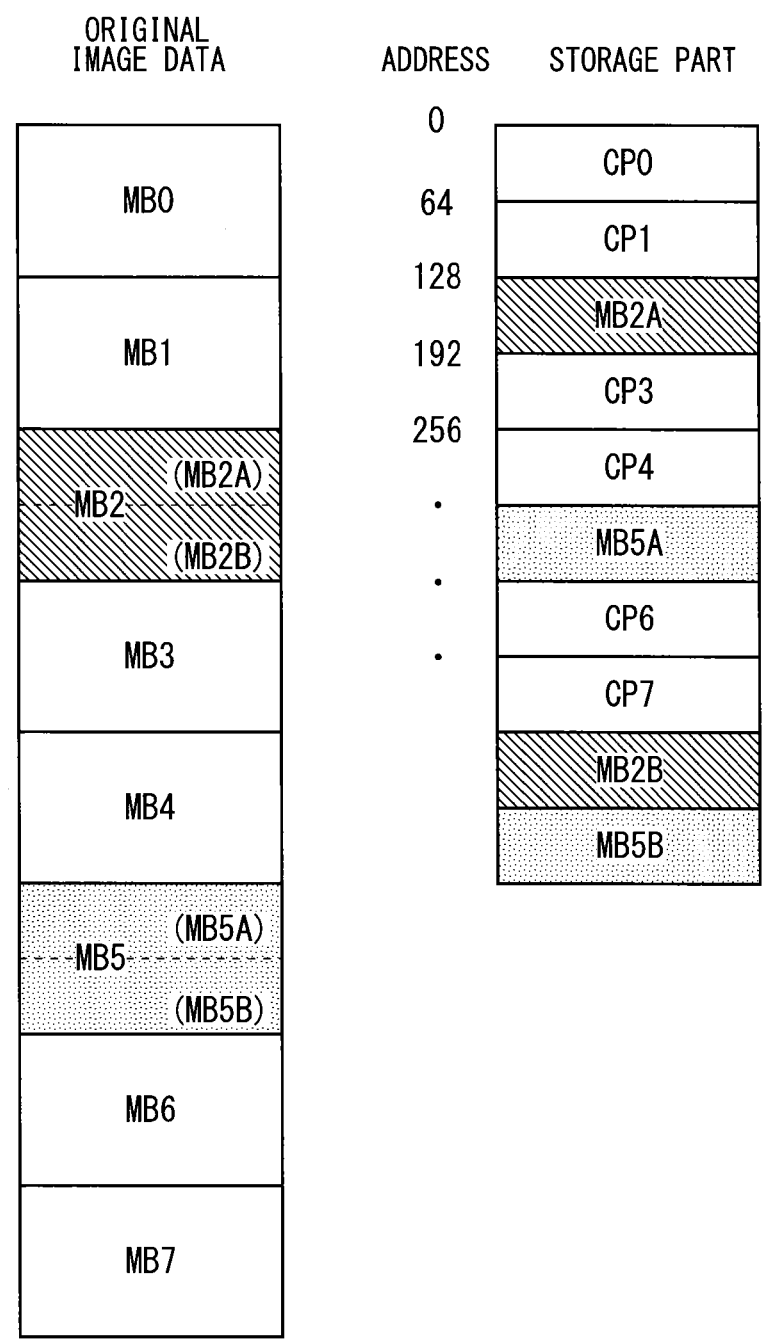
FIG. 10 shows an example of addresses allocated to data pieces stored in the storage part.

Next is a detailed description of storage control processing performed by the storage control part 13. FIG. 9 shows a mode of storing data in the storage part 5. FIG. 10 shows an example of addresses allocated respectively to data pieces stored in the storage part 5. FIG. 11 shows another mode of storing data in the storage part 5.

When receiving input of the block image data MB that lossless compression is possible, the storage control part 13 stores the compressed data CP generated based on the block image data MB in a first storage area of the storage part 5.

On the other hand, when having received input of the block image data MB that lossless compression is not possible, the storage control part 13 divides the block image data MB into two pieces of data and stores the two pieces of data obtained by the division respectively in the first storage area and a second storage area different from the first storage area.

For example, as shown in FIG. 9, assume the case in which eight block image data pieces MB0 to MB7 including two block image data pieces MB2 and MB5 that lossless compression is not possible are sequentially input to the data storage control apparatus 1, starting from the block image data piece MB0.

In this case, for the block image data pieces MB0, MB1, MB3, MB4, MB6, and MB7 that lossless compression is not possible, the storage control part 13 stores corresponding compressed data pieces CP0, CP1, CP3, CP4, CP6, CP7 in a first storage area MR1.

On the other hand, for the block image data piece MB2 that lossless compression is not possible, the storage control part 13 stores part (partial data) MB2A of the block image data piece MB2 in the first storage area MR1 and stores the remaining data (residual data) MB2B other than the partial data MB2A in a second storage area MR2.

Similarly, for the block image data piece MB5 that lossless compression is not possible, the storage control part 13 stores partial data MB5A of the block image data piece MB5 in the first storage area MR1 and stores the remaining data MB5B other than the partial data MB5A in the second storage area MR2.

When storing the block image data pieces MB2 and MB5 in the storage part 5, the storage control part 13 equalizes the data amount between the partial data MB2A (MB5A) stored in the first storage area MR1 and the other compressed data CP (CP0, CP1, CP3, and so on) stored in the first storage area MR1.

For example, as shown in FIG. 9, when the data amount of the block image data MB is compressed to half by lossless compression, the storage control part 13 reduces the partial data MB2A stored in the first storage area MR1 to half the block image data MB.

As a result, data pieces having equal data amounts are stored in the first storage area MR1 and this facilitates the management of addresses of the data pieces.

For example, as shown in FIG. 10, assume that the data amount of the compressed data CP output from the data storage control apparatus 1 is equal to or less than the capacity of a storage area specified by 64 addresses in the first storage area MR1.

In this case, the compressed data piece CP0 is stored in a storage area specified by addresses "0" to "63," and the compressed data piece CP1 is stored in a storage area specified by addresses "64" to "127." The partial data MB2A of the block image data MB2 is stored in a storage area specified by addresses "128" to "191."

In this way, in the first storage area MR1, the start addresses of the storage areas for storing data pieces are at the same intervals (equal intervals) (in FIG. 10, at intervals of 64). This makes it possible to easily identify the start address of each data piece and makes it easy to specify addresses at the time of writing and reading. In other words, the address management is facilitated.

Note that the data amount of the other compressed data pieces CP to be stored in the first storage area MR1 can be specified using the data obtained through the compression processing and input from the compression part 11.

The storage control part 13 also stores the compression determination flag input from the compression-determination-flag generation part 12 in the storage part 5.

The compression determination flag is 1-bit data indicating whether or not lossless compression was able to be performed on the block image data MB and is thus stored in units of the block image data MB. A mode of storing the compression determination flag is, for example, such that the compression determination flags in units of the block image data piece MB are collectively stored as compression determination flag data CPF in the storage part 5 as shown in FIG. 9. It is also preferable for the compression determination flag data CPF to be stored in an area different from the first storage area MR1 and the second storage area MR2.

By storing the compression determination flags, which data is compressed data CP and which data is partial data of block image data MB, among data pieces stored in the first storage area MR1, can be specified based on the data stored in the storage part 5. The compression determination flags are used to restore the image GA from the data stored in the storage part 5.

While FIG. 9 shows an example of the case where the data amount of the block image data MB is compressed to a half by lossless compression, FIG. 11 shows a case in which the data amount of the block image data MB is compressed to two thirds by lossless compression. In other words, two-thirds of the block image data MB2 (MB5) is the partial data MB2A (MB5A) stored in the first storage area MR1, and the remaining one-third is the residual data MB2B (MB5B) stored in the second storage area MR2.

As described above, the data storage control apparatus 1 of the present embodiment includes the compression part 11 that performs lossless compression for reducing the data amount on the image data MB in units of blocks, the determination means for determining whether lossless compression is possible or not, and the storage control part 13 that performs storage control for, if the determination means has determined that lossless compression is possible, causing data obtained through lossless compression to be stored as the compressed data CP in the storage part 5, and if the determination means has determined that lossless compression is not possible, causing the image data MB in units of blocks to be stored in the storage part 5.

With the data storage control apparatus 1 that stores compressed data in the storage part 5 if lossless compression is possible and stores the image data MB in units of blocks in the storage part 5 if lossless compression is not possible, the possibility of being able to reduce the data amount while generating lossless data with no data degradation can be greatly enhanced.

1-5. Data Readout Control Apparatus

Figure 12:
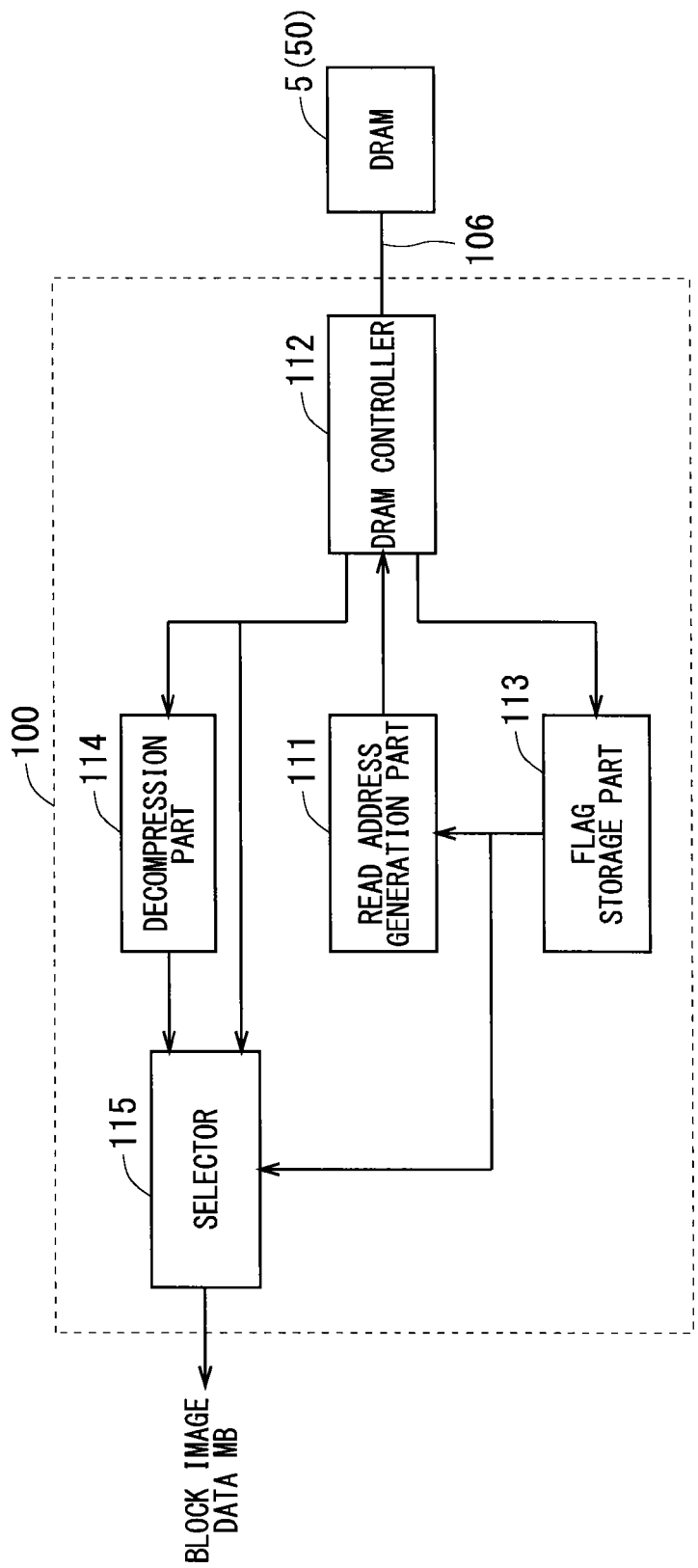
FIG. 12 is a block diagram showing a configuration of a data readout control apparatus according to the embodiment of the present invention.

Next is a description of a data readout control apparatus for reading out data stored in the storage part 5 by the above-described data storage control apparatus 1. FIG. 12 is a block diagram showing a configuration of a data readout control apparatus 100 according to an embodiment of the present invention.

As shown in FIG. 12, the data readout control apparatus 100 is electrically connected to the DRAM 50 serving as the storage part 5 via a bus 106.

The data readout control apparatus 100 includes a read address generation part 111, a DRAM controller 112, a flag storage part 113, a decompression part 114, and a selector (selection means) 115. The data readout control apparatus 100 restores and outputs the block image data MB on the basis of the data (storage data) stored in the DRAM 50.

The read address generation part 111 generates an address (read address) indicating a storage location of data to be read out among the data stored in the DRAM 50 and outputs the generated address to the DRAM controller 112.

The DRAM controller 112 causes the DRAM 50 to output data stored in the storage location specified by the read address. When having read out the compression determination flag data CPF from the DRAM 50, the DRAM controller 112 outputs the compression determination flag data CPF to the flag storage part 113. When having read out the compressed data CP or the block image data MB (specifically, the partial data and remaining data of the block image data MB) from the DRAM 50, the DRAM controller 112 outputs the compressed data CP and the block image data MB to the decompression part 114 and the selector 115.

In this way, the read address generation part 111 and the DRAM controller 112 operate in cooperation with each other and function as readout means for reading out the data stored in the DRAM 50.

The flag storage part 113 is constituted by a SRAM, a register, or the like and stores the compression determination flag data CPF read out from the DRAM 50.

The decompression part 114 decompresses the compressed data CP read out from the DRAM 50 to generate the block image data MB. As a decompression technique, a technique corresponding to the lossless compression technique used for lossless compression is adopted. For example, data compressed using the above-described lossless compression technique is decompressed through the opposite procedure. The decompressed data is input to the selector 115.

The selector 115 selects and outputs either the data input from the decompression part 114 or the data input from the DRAM controller 112 on the basis of the compression determination flag input from the flag storage part 113. Specifically, when having received input of the determination flag "1" indicating that lossless compression is possible, the selector 115 outputs the data input from the decompression part 114. On the other hand, when having received input of the determination flag "0" indicating that lossless compression is not possible, the selector 115 outputs the data input from the DRAM controller 112. Note that the data input from the DRAM controller 112 consists of two data pieces obtained by dividing the block image data MB. Thus, the selector 115 combines the two input data pieces to generate the block image data MB and outputs the generated block image data MB.

The following is a description of operations performed by the data readout control apparatus 100 having the above-described configuration. FIG. 13 is a flowchart of the operations of the data readout control apparatus 100.

As shown in FIG. 13, the compression determination flag data CPF stored in the DRAM 50 is first acquired in step SP51 before the block image data MB is read out.

Specifically, the read address generation part 111 generates a read address indicating the storage location of the compression determination flag data CPF and outputs the generated read address to the DRAM controller 112. In response to the input of the read address, the DRAM controller 112 reads out the compression determination flag data CPF from the DRAM 50 and stores the compression determination flag data CPF in the flag storage part 113.

Next, in step SP52, either the compressed data CP of the block image data MB caused to be output from the data readout control apparatus 100, or the partial data and residual data thereof is read out from the DRAM 50.

Specifically, the read address generation part 111 acquires the compression determination flag regarding the block image data MB to be output from the flag storage part 113 and determines whether or not lossless compression of the block image data MB to be output is possible. If the lossless compression is possible, the read address generation part 111 generates a read address and outputs the generated read address to the DRAM controller 112 for reading out the compressed data CP from the first storage area MR1 of the DRAM 50. On the other hand, if the lossless compression is not possible, the read address generation part 111 generates a read address for reading out the partial data stored in the first storage area MR1 and also generates a read address for reading out the residual data stored in the second storage area MR2. The generated two read addresses are output to the DRAM controller 112.

The DRAM controller 112 causes the DRAM 50 to output the compressed data CP stored in the storage locations specified by the read addresses, or the partial data and residual data thereof. Then, the DRAM controller 112 outputs the compressed data CP output from the DRAM 50, or the partial data and residual data thereof to the decompression part 114 and the selector 115.

In step SP53, the decompression part 114 decompresses the compressed data CP.

In step SP54, the selector 115 performs output control of the block image data MB. Specifically, one of the data input from the decompression part 114 and the data input from the DRAM controller 112 is selected on the basis of the compression determination flag, and the selected data is output as the block image data MB.

In step SP55, it is determined whether or not there are any other block image data MB to be output. If there is another block image data MB to be output, the operational procedure proceeds to step SP52, and the processing of steps SP52 to SP55 is repeatedly performed. On the other hand, if there is no other block image data MB to be output, the operational procedure ends.

As described above, the data readout control apparatus 100 is configured to be capable of reading out storage data from the storage part 5. The storage part 5 stores, as the storage data, the compressed data CP of the image data MB in units of blocks that is stored when lossless compression of the image data MB in units of blocks is possible or the image data MB in units of blocks that is stored when the lossless compression is not possible, and the compression determination flag indicating whether or not the lossless compression is possible. The data readout control apparatus 100 includes the readout means for reading out the storage data, the decompression part 114 capable of decompressing the compressed data CP included in the storage data, and the selector 115 that outputs decompressed data if the storage data includes the compression determination flag indicating that lossless compression is possible, and outputs the image data MB in units of blocks included in the storage data if the storage data includes the compression determination flag indicating that the lossless compression is not possible.

The data readout control apparatus 100 with such a configuration is capable of reading out the data stored in the storage part 5 using the data storage control apparatus 1, and outputting the image data MB in units of blocks.

2. Variations

While the above has been a description of an embodiment, the present invention is not limited to the content described above.

For example, while the above-described embodiment takes the example of the case where the DRAM 50 serves as the storage part 5, the storage part 5 may be an SRAM.

A configuration is also possible in which the above-described data storage control apparatus 1 and the storage part 5 are mounted on the same chip. Such a single chip that includes both of the data storage control apparatus 1 and the storage part 5 is also referred to as a data storage apparatus. By mounting the data storage control apparatus 1 and the storage part 5 on the same chip in this way, it is possible to reduce the wiring required to connect the data storage control apparatus 1 and the storage part 5 and to reduce the scale of the circuit.

The compression technique used in the compression part 11 of the data storage control apparatus 1 is not limited to the one described above and may be any other technique. One example of other techniques is a technique for providing a plurality of (e.g., two) reference pixels in the block image MG, calculating a difference in pixel value between adjacent pixels for each normal pixel so that the pixel value of each normal pixel other than the reference pixels can be calculated from the pixel value of one of the reference pixels, and representing the difference in pixel value by a prescribed information amount.

Note that although it is conceivable to use a technique for encoding the block image data MB in the JPEG XR format to reduce the data amount, adopting the JPEG XR format will increase the scale of the circuit and increase the amount of computation and processing time required for image encoding. In contrast, in the case of adopting the aforementioned compression technique, it is possible to reduce the scale of the circuit of the data storage control apparatus 1 as well as to reduce the amount of computation and processing time required for compression.

While the above-described embodiment takes the example of the case where the block image MG input to the data storage control apparatus 1 has a size of 8×8 pixels, the present invention is not limited thereto. Specifically, the block image may be of any arbitrary size of N×M pixels (where N and M are natural numbers) such as 4×4 pixels, 16×16 pixels, and 8×16 pixels.

While the above embodiment describes the data storage control apparatus 1 and the data readout control apparatus 100 separately, a configuration is also possible in which the data storage control apparatus 1 and the data readout control apparatus 100 are mounted in the same apparatus.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1 Data storage control apparatus
5 Storage part
11 Compression part
12 Compression-determination-flag generation part
13 Storage control part
100 Data readout control apparatus
111 Read address generation part
112 Controller
113 Flag storage part
114 Decompression part
115 Selector
KP Reference pixel
MG Block image
MB Block image data
MR1 First storage area
MR2 Second storage area
UD, LD Pixel value information group

The invention claimed is:

1. A data storage control apparatus comprising:
circuitry configured to:
perform lossless compression for reducing a data amount on image data that is in units of blocks by determining a reference pixel from among pixels constituting a block and calculating a difference in a pixel value between adjacent pixels for each normal pixel other than said reference pixel;
determine whether said lossless compression of the block is possible or not by determining whether or not the difference in the pixel value for every said normal pixels in the block is representable in a smaller number of bits than a number of bits used to represent said reference pixel;
perform storage control for, in a case where the circuitry determine that lossless compression is possible, causing data obtained through said lossless compression to be stored as compressed data in a storage part, and in a case where the circuitry determine that lossless compression is not possible, causing said image data in units of blocks to be stored in said storage part.

2. The data storage control apparatus according to claim 1, wherein the circuitry is further configured to:
sequentially receive input of said image data in units of blocks that is obtained by dividing original image data,
perform said lossless compression on each image data piece in units of blocks that is sequentially input,
determine whether said lossless compression is possible or not for said each image data piece, and
perform said storage control on said each image data piece based on a result of determination by said circuitry regarding said each image data piece.

3. The data storage control apparatus according to claim 2, wherein the circuitry is further configured to perform said storage control for
in a case where said circuitry determines that lossless compression is possible, causing said compressed data to be stored in a first storage area of said storage part, and
in a case where said circuitry determines that lossless compression is not possible, among said image data in units of blocks, causing image data that has a data amount equal to a data amount of said compressed data to be stored as partial data in said first storage area and causing remaining data other than said partial data to be stored in a second storage area of said storage part.

4. The data storage control apparatus according to claim 3, wherein the circuitry is further configured to store said compressed data and said partial data such that addresses indicating storage locations of said compressed data and said partial data in said first storage area are at equal intervals.

5. The data storage control apparatus according to claim 1, wherein the circuitry is further configured to generate a compression determination flag that indicates whether lossless compression is possible or not, based on a result of determination by said circuitry,
wherein the circuitry stores said compression determination flag in said storage part.

6. The data storage control apparatus according to claim 1, wherein the circuitry is further configured to:
convert a data amount by representing the difference in the pixel value calculated for said each normal pixel by the smaller number of bits than the number of bits used to represent said reference pixel.

7. The data storage control apparatus according to claim 1, wherein the circuitry is further configured to:
   determine a pixel at one corner of a block image as a reference pixel, calculate a difference in a pixel value between adjacent pixels for each pixel in the same row as said reference pixel, and calculate a difference in the pixel value between adjacent pixels for each pixel in each column of pixels constituting said block image; and
   convert a data amount by, while holding a pixel value of said reference pixel, representing each calculated difference in the pixel value between adjacent pixels by the smaller number of bits than the number of bits used to represent said reference pixel.

8. The data storage control apparatus according to claim 1, wherein the circuitry is further configured to:
   determine a pixel at one corner of a block image as the reference pixel, calculate a difference in a pixel value between adjacent pixels for each pixel in the same column as said reference pixel, and calculate a difference in a pixel value between adjacent pixels for each pixel in each row of pixels constituting said block image; and
   convert a data amount by, while holding a pixel value of said reference pixel, representing each calculated difference in the pixel value between adjacent pixels by the smaller number of bits than the number of bits used to represent said reference pixel.

9. A data storage apparatus comprising:
   a data storage control apparatus according to claim 1; and
   said storage part that is electrically connected to said data storage control apparatus,
   wherein said data storage control apparatus and said storage part are mounted on a same chip.

10. A data readout control apparatus capable of reading out storage data from a storage part that stores, as said storage data, compressed data of image data in units of blocks that is stored when lossless compression of said image data in units of blocks is possible or said image data in units of blocks that is stored when said lossless compression is not possible, and a compression determination flag indicating whether said lossless compression is possible or not,
   said data readout control apparatus comprising:
   circuitry configured to:
   perform lossless compression for reducing a data amount on image data that is in units of blocks by determining a reference pixel from among pixels constituting a block and calculating a difference in a pixel value between adjacent pixels for each normal pixel other than said reference pixel;
   read out said storage data;
   decompress said compressed data included in said storage data; and
   in a case where said storage data includes a compression determination flag indicating that said lossless compression is possible, output data obtained through said decompression, and in a case where said storage data includes a compression determination flag indicating that said lossless compression is not possible, output said image data in units of blocks that is included in said storage data, wherein whether said lossless compression of the block is possible or not is determined by determining whether or not the difference in the pixel value for every said normal pixels in the block is representable in a smaller number of bits than a number of bits used to represent said reference pixel.

11. A data storage method comprising the steps of:
   a) performing lossless compression for reducing a data amount on image data that is in units of blocks by determining a reference pixel from among pixels constituting a block and calculating a difference in a pixel value between adjacent pixels for each normal pixel other than said reference pixel;
   b) determining whether said lossless compression of the block is possible or not by determining whether or not the difference in the pixel value for every said normal pixels in the block is representable in a smaller number of bits than a number of bits used to represent said reference pixel; and
   c) in a case where said lossless compression is possible, storing data obtained through said lossless compression as compressed data in a storage part, and in a case where said lossless compression is not possible, storing said image data in units of blocks in said storage part.

12. A compression method executed by said data storage control apparatus according to claim 1, the method comprising:
   converting, by said data storage control apparatus, a data amount by representing the difference in the pixel value calculated for said each normal pixel by the smaller number of bits than the number of bits used to represent said reference pixel.

13. A compression circuit for compressing image data of an original image having a size of N×M pixels, where N and M are natural numbers, comprising:
   circuitry configured to:
   perform lossless compression for reducing a data amount on the image data that is in units of blocks by determining a reference pixel from among pixels constituting a block and calculating a difference in a pixel value between adjacent pixels for each normal pixel other than said reference pixel;
   determine whether the lossless compression of the block is possible or not by determining whether or not the difference in the pixel value for every said normal pixels in the block is representable in a smaller number of bits than a number of bits used to represent said reference pixel; and
   convert a data amount by representing the difference in the pixel value calculated for said each normal pixel by the smaller number of bits than the number of bits used to represent said reference pixel.

14. A compression method for compressing image data of an original image having a size of N×M pixels, where N and M are natural numbers, the compression method comprising the steps of:
   a) performing lossless compression for reducing a data amount on the image data that is in units of blocks by determining a reference pixel from among pixels constituting a block and calculating a difference in a pixel value between adjacent pixels for each normal pixel other than said reference pixel;
   b) determining whether the lossless compression of the block is possible or not by determining whether or not the difference in the pixel value for every said normal pixels in the block is representable in a smaller number of bits than a number of bits used to represent said reference pixel; and
   c) converting a data amount by representing the difference in the pixel value calculated for said each normal pixel by the smaller number of bits than the number of bits used to represent said reference pixel.

* * * * *